United States Patent [19]
Morimoto

[11] Patent Number: 6,105,950
[45] Date of Patent: Aug. 22, 2000

[54] RETAINER

[75] Inventor: Eiji Morimoto, Osaka, Japan

[73] Assignee: Kyocera Mita Corporation, Osaka, Japan

[21] Appl. No.: 09/320,277

[22] Filed: Jun. 2, 1999

[30] Foreign Application Priority Data

Jul. 14, 1998 [JP] Japan .................................. 10-198665

[51] Int. Cl.$^7$ .................................................. B23Q 1/00
[52] U.S. Cl. ............................................. 269/47; 269/52
[58] Field of Search ........................................ 269/47, 52

[56] References Cited

FOREIGN PATENT DOCUMENTS 1187944  10/1985  U.S.S.R. .................................. 269/47

*Primary Examiner*—David A. Scherbel
*Assistant Examiner*—Daniel G. Shanley
*Attorney, Agent, or Firm*—Smith, Gambrell & Russell, LLP

[57] ABSTRACT

A retainer capable of absorbing a positional difference between the moving and placing coordinates set in a moving and placing machine and the axis of a work, thus restraining the work from being defectively moved and placed. The retainer includes: a pillar-like member having a base end portion to stand on a base plate; a narrow portion formed at the center part of the pillar-like member; and a holding portion which is formed at the tip end of the pillar-like member, which is thicker than the narrow portion, and which is arranged to fit the cylindrical inner peripheral surface of a work.

7 Claims, 6 Drawing Sheets

RETAINER

BACKGROUND OF THE INVENTION

1. Field of the Invention

The present invention relates to a retainer for holding, on a work-delivery box or palette, a produced photoreceptor drum or a base tube serving as its raw material, in a process for producing photoreceptor drums to be used in an image forming apparatus such as an electrophotographic copying apparatus, a printer, a facsimile or the like.

2. Description of Related Art

FIG. 1 is a flow chart or diagram schematically illustrating the steps of producing photoreceptor drums. First, a base tube 1 serving as a raw material of a photoreceptor drum is loaded in a production line. For example, the base tube 1 is obtained by machining an extruded base tube of aluminum of which diameter is about 60~300 mm and length is up to about 600 mm. At a high-pressure cleaning step, a detergent or the like under high pressure is sprayed to the outer and inner peripheral surfaces of the base tube 1 which is vertically moved while rotated. This removes dust and oil content stuck on the surfaces of the base tube 1.

At an ultrasonic cleaning step, the base tube 1 is subjected to ultrasonic cleaning in a detergent for degreasing. At a brush cleaning step, the outer peripheral surface of the base tube 1 is rubbed and cleaned with a rotary brush 2, thereby to remove firmly adhering foreign matter. Upon completion of degreasing and polishing by cleaning, a rinsing step is then conducted. More specifically, the base tube 1 is put in pure water into which clean air is blown to cause bubbling. With the use of bursting of air bubbles, the base tube 1 is rinsed. At a hot-water pulling step, the base tube 1 is slowly pulled up from pure water, which has been heated to decrease the viscosity. This drains water off from the surfaces of the base tube 1.

Upon completion of the cleaning steps above-mentioned, there is conducted a drying step where the adsorbed water on the surfaces of the base tube 1 is removed in an atmosphere of 130~140° C. At a coating step, the base tube 1 with the upper end thereof hermetically sealed, is immersed, except for the upper end thereof, in a previously prepared solution of a photosensitive material which is circulated. Thus, the base tube 1 is coated at its outer peripheral surface with the photosensitive material. At a lower-end separating step, there is separated the photosensitive material coated to the outer and inner peripheral surfaces of the base tube 1 at its lower end.

At a thermal-treating step, the base tube 1 is gradually heated at a predetermined temperature gradient. Without so-called bubble defects produced, this removes the solvent in the coated photosensitive material and solidifies the photosensitive material.

The steps above-mentioned are conducted in a clean room.

At an inspection step, the base tube 1 is subjected to an appearance inspection. Then, at an assembling step, flanges are attached to the both ends of a photoreceptor drum thus produced. The photoreceptor drum thus assembled is then packed and stored.

A moving and placing machine is conventionally used to pick, move and place a base tube 1 (or a produced photoreceptor drum) from, to and on machines for conducting the steps above-mentioned.

FIG. 2 is a view schematically illustrating the arrangement of a chucking device of a moving and placing machine (not shown) for use in a production step. A chuck shaft 6 is fixed to a chuck-fixing unit 7 of the moving and placing machine movable vertically in the directions of arrows. A chuck 5 is secured to the lower end of the chuck shaft 6. The chuck 5 is arranged to pick a base tube 1. The chuck 5 is provided at the lower end thereof with a tapered guide 4 for guiding itself into a base tube 1. The base tube 1 is to be held, as standing up, by a retainer 3 which stands on a work-delivery box or a palette for conveying base tubes 1.

The chuck 5 in FIG. 2 is generally called an air picker or the like. More specifically, the chuck 5 has a balloon-like expandable body made of an elastic material such as rubber or the like, and is arranged to expand and contract by putting air in and out from this expandable body such that the base tube 1 is picked at the inner peripheral surface thereof. A chuck of other type may also be used. For example, as shown in FIG. 3, there may be used a link-type chuck 8 having a radially expandable arm 8a.

For picking a base tube 1, with the chuck 5 contracting in FIG. 2, the chuck-fixing unit 7 is lowered. While guided by the guide 4, the chuck 5 enters the inside of the base tube 1 from the upper end-thereof. Then, the chuck 5 is expanded to chuck the base tube 1 at the inner peripheral surface thereof. At this state, the chuck-fixing unit 7 is upwardly moved to lift the base tube 1. Then, the base tube 1 is moved to and placed on a machine for conducting another step, by the moving and placing machine having the chuck fixing unit 7. There are instances where instead of the base tube 1, a produced photoreceptor drum is moved and placed. Such base tube 1 or photoreceptor drum is generally called a work.

In picking, moving and placing works such as base tubes, work-delivery boxes or palettes for conveying base tubes or the like are successively fed with progress of the production. This produces positional differences between the moving and placing coordinates set in moving and placing machines and the axes of base tubes 1 or the like held by retainers 3, and such positional differences are not constant. If such positional differences are large, this results in defective movement and placement of works.

It is now supposed that, as shown in FIG. 4, the axes of the base tube 1 and the chuck 5 are positionally shifted by a length L. In such a case, even though the chuck 5 is lowered as shown by an arrow, the guide 4 comes in contact with the upper end of the base tube 1. This prevents the chuck 5 from being smoothly inserted. The chuck shaft 6 is securely fixed to the chuck-fixing unit 7. Accordingly, if the chuck 5 is lowered with the guide 4 being in contact with the base tube 1, this involves the likelihood that the base tube 1 is thrown down or crushed at its upper end.

More specifically, the retainer 3 comprises a column-like member upwardly extending from a palette 10 and its upper end is pointed in a tapering manner as shown in FIG. 5. The retainer 3 has an outer diameter determined according to the inner diameter of the base tube 1 such that the retainer 3 is fitted to the base tube 1 with a predetermined gap provided therebetween. For example, there are instances where for a base tube 1 having an inner diameter of 14 mm, there can theoretically be allowed only a difference of 4.388 mm between the axes of the upper end of the base tube 1 and the retainer 3, as shown in FIG. 5. If there is present a difference between the axes of the retainer 3 and the chuck 5 more than 4.388 mm, the retainer 3 probably rubs against the base tube 1 when the same is picked. Thus, there is a possibility of the base tube 1 being damaged or defectively moved and placed.

SUMMARY OF THE INVENTION

It is an object of the present invention to provide a retainer capable of absorbing a positional difference between the moving and placing coordinates set in a moving and placing machine and the axis of a work, thus restraining the work from being defectively moved and placed.

In the retainer of the present invention, a narrow portion is formed at the periphery of the center part of a standing pillar-like member (for example, column member), and a portion which is not narrowed in the pillar-like member, serves as a holding portion which is arranged to fit and hold a predetermined cylindrical member. For example, the holding portion comprises one of those parts of the narrow portion at its upper and lower ends that are not narrowed.

Preferably, the column-like member is provided at the upper end thereof with a tapered portion. This makes it easier to fit the cylindrical member with the retainer.

The cylindrical member is a photoreceptor drum or a base tube serving as its raw material.

The present invention provides a retainer capable of absorbing a positional difference between the moving and placing coordinates set in a moving and placing machine and the axis of a work, thus restraining the work from being defectively moved and placed.

Further, the gap or clearance between the outer diameter of the holding member and the inner diameter of the cylindrical member, can be reduced to a predetermined value. This assures the positional precision of the cylindrical member to be held. Further, the narrow portion prevents the lower end of the cylindrical member from coming in contact with the retainer. This increases the allowance for positional shift.

These and other features, objects and advantages of the present invention will be more fully apparent from the following detailed description set forth below when taken in conjunction with the accompanying drawings.

DESCRIPTION OF THE PREFERRED EMBODIMENTS

Figure 1:
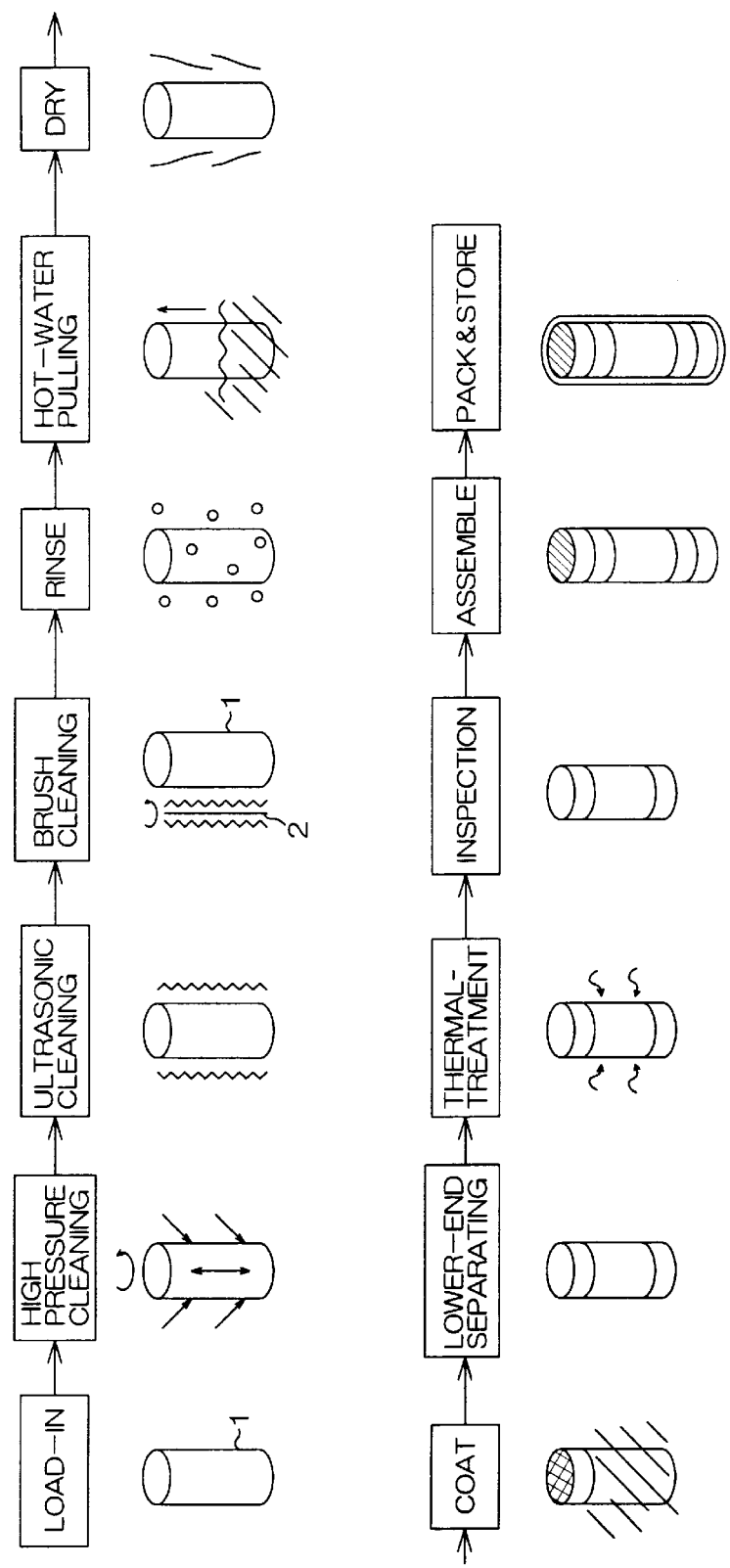
FIG. 1 is a flow chart schematically illustrating the steps of producing a photoreceptor drum.
Figure 2:
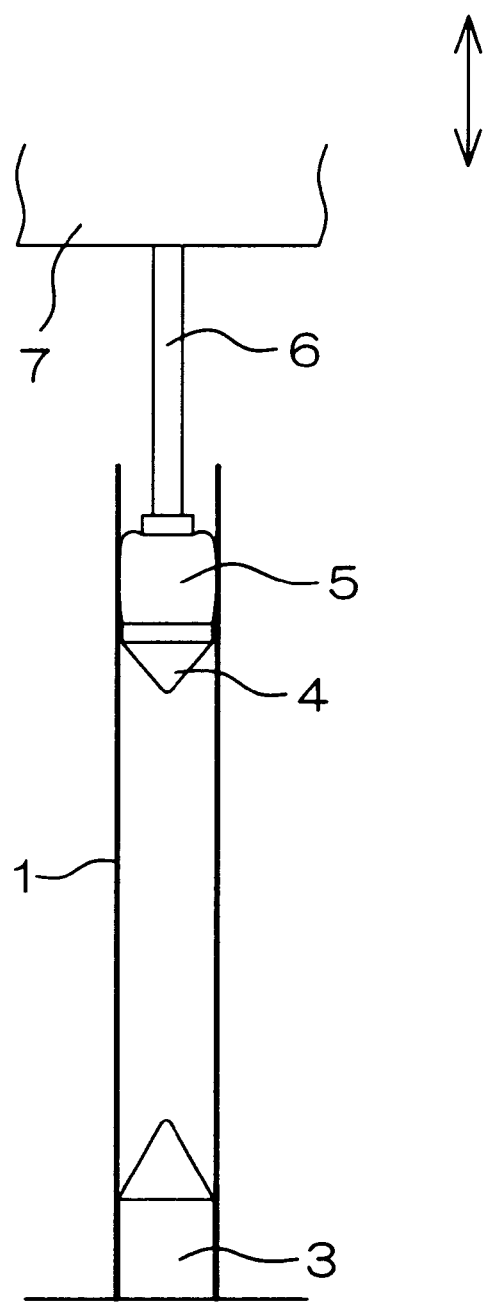
FIG. 2 is a view schematically illustrating the arrangement of a chucking device of a moving and placing machine.
Figure 3:
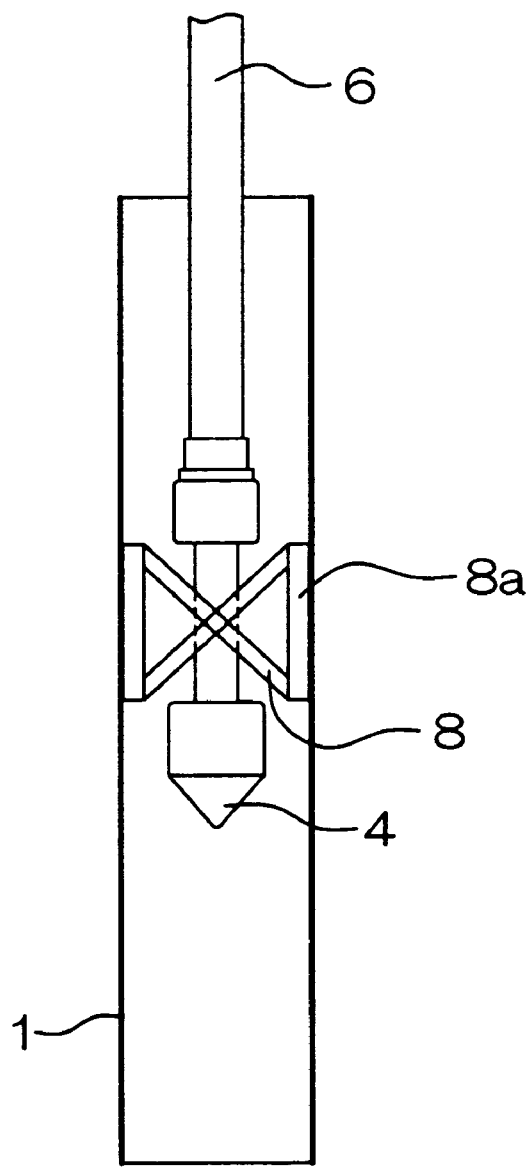
FIG. 3 is a view illustrating an example in which a link-type chuck is used.
Figure 4:
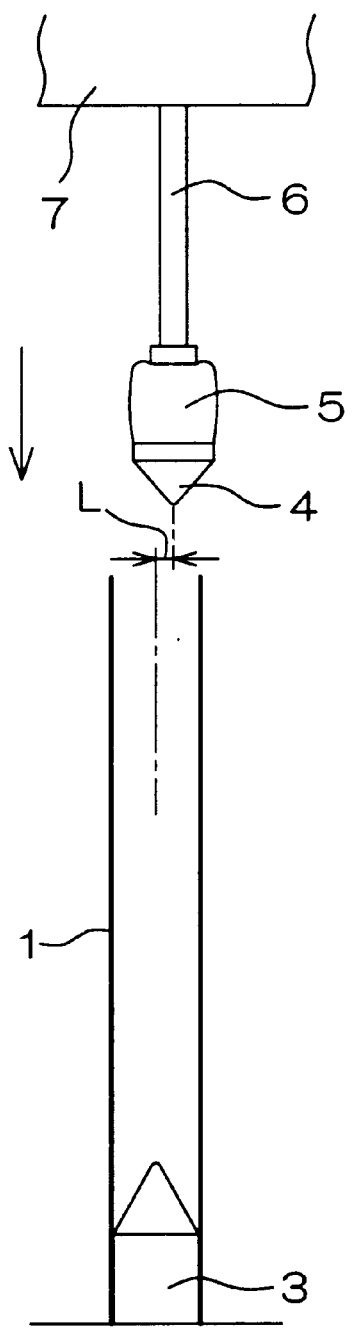
FIG. 4 is a view illustrating a case where the axes of the base tube and the chuck are positionally shifted.
Figure 5:
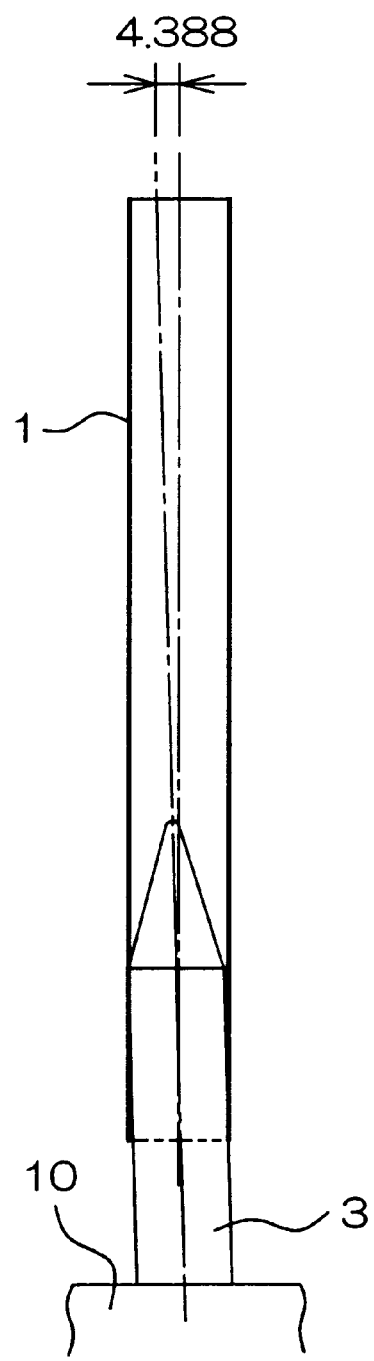
FIG. 5 is a view schematically illustrating the arrangement of a retainer of prior art.
Figure 6:
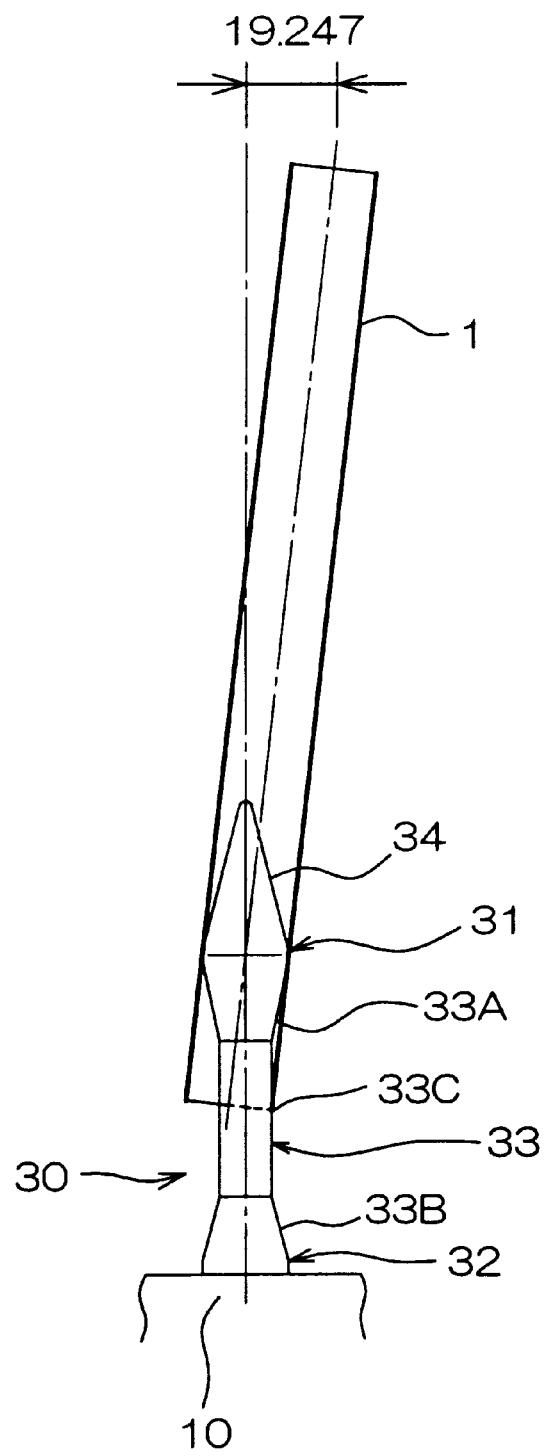
FIG. 6 is a view schematically illustrating the arrangement of a retainer according to an embodiment of the present invention.

FIG. 6 is a view schematically illustrating the arrangement of a retainer according to an embodiment of the present invention.

A retainer 30 stands from a palette 10 with the base end of the retainer 30 fixed thereto, and is substantially formed of a column-like member. The retainer 30 is provided at the center of the column portion thereof with a narrow portion or a neck 33. The retainer 30 is provided at upper and lower two positions thereof with first and second holding portions 31, 32, shown by arrows, which are not narrowed. The retainer 30 is arranged to fit and hold a cylindrical base tube 1 only at these holding portions 31, 32. By so arranging the holding portions 31, 32 that the gap between the outer diameter of the holding portions 31, 32 and the inner diameter of the base tube 1 is not more than a predetermined value, the positional precision of the base tube 1 before movement and placement is assured. Further, the narrow portion 33 prevents the lower end of the base tube 1 from coming in contact with the retainer 30. This increases the allowance for positional shift in axis.

More specifically, the positional difference in axis between the retainer 30 and the upper end of a base tube 1 having an inner diameter of 14 mm, may theoretically be allowed up to 19.247 mm as shown in FIG. 6. Accordingly, even though there occurs a positional difference of 19.247 mm or less in axis between the retainer 30 and the chuck 5, it is possible to prevent the base tube 1 from being damaged or defectively moved and placed.

The retainer 30 is provided, at the tip side with respect to the first holding portion 31, with a tip tapered portion 34 terminating in the first holding portion 31. The action of the tip tapered portion 34 facilitates the fitting of the base tube 1 to the retainer 30.

The narrow portion 33 has a first tapered portion 33A at its part connected to the first holding portion 31, a second tapered portion 33B at its part connected to the second holding portion 32, and a column portion 33C between the first and second tapered portions 33A and 33B. The upper end edge (large-diameter-side periphery) of the first tapered portion 33A forms part of the first holding portion 31. The lower end edge (large-diameter-side periphery) of the second tapered portion 33B forms part of the second holding portion 32.

Each of the first and second holding portions 31, 32 is circular in section at a right angle to the longitudinal direction of the retainer 30. The outer diameter of the holding portions 31, 32, is determined such that a predetermined gap is provided with respect to the inner peripheral surface of the base tube 1.

It is noted that the retainer 30 can be used for holding not only a cylindrical member, but also a member that has an outer peripheral surface of other shape than a cylindrical shape, as far as the member has a cylindrical inner peripheral surface.

Alternatively, when a work can stand by itself, the second holding portion 32 is not necessarily required.

An embodiment of the present invention has thus been discussed in detail, but this embodiment is a mere specific example for clarifying the technical contents of the present invention. Therefore, the present invention should not be construed as limited to this embodiment. The spirit and scope of the present invention are limited only by the appended claims.

This application claims priority benefits under 35 USC, Section 119 of Japanese Patent Application Serial No. 10-198665, filed on Jul. 14, 1998 with the Japanese Patent Office, the disclosure of which is incorporated herein by reference.

What is claimed is:

1. A retainer for holding a predetermined member having a cylindrical inner peripheral surface by fitting the cylindrical inner peripheral surface, the retainer comprising:

a pillar-like member having a base end portion to stand on a base;

a narrow portion formed at a center part of the pillar-like member;

a first holding portion which is formed at a tip end of the pillar-like member, which is thicker than the narrow portion, and is arranged to fit a cylindrical inner peripheral surface of a predetermined member;

a first tapered portion that tapers from the first holding portion to the narrow portion of the pillar-like member; and a tip tapered portion that tapers from the first holding portion to a tip of the pillar-like member, the first tapered portion and the tip tapered portion meeting at the first holding portion, the first holding portion thereby having a largest diameter peripheral edge of the tip end.

2. A retainer according to claim 1, wherein the first holding portion is circular in section at a right angle to the pillar-like member, the sectional circular shape conforming to the cylindrical inner peripheral surface.

3. A retainer according to claim 1, further comprising, at the base end of the pillar-like member, a second holding portion which is thicker than the narrow portion and which is arranged to fit the cylindrical inner peripheral surface.

4. A retainer according to claim 3, wherein the narrow portion having, at its part connected to the second holding portion, a second tapered portion.

5. A retainer according to claim 3, wherein the second holding portion is circular in section at a right angle to the pillar-like member, the sectional circular shape conforming to the cylindrical inner peripheral surface.

6. A retainer according to claim 1, wherein the retainer holds a predetermined member having a cylindrical inner peripheral surface, and said predetermined member is a cylindrical member.

7. A retainer according to claim 6, wherein the cylindrical member is a photoreceptor drum or a base tube serving as a raw material thereof.

* * * * *